(12) United States Patent
Dooley (10) Patent No.: US 11,465,550 B1
(45) Date of Patent: Oct. 11, 2022

(54) SYSTEMS AND METHODS FOR VISUALLY DETERMINING SECURITY OF TIE-DOWN CARGO STRAPS

(71) Applicant: Rick Dooley, Woodstock, IL (US)

(72) Inventor: Rick Dooley, Woodstock, IL (US)

( * ) Notice: Subject to any disclaimer, the term of this patent is extended or adjusted under 35 U.S.C. 154(b) by 0 days.

(21) Appl. No.: 16/930,102

(22) Filed: Jul. 15, 2020

(51) Int. Cl.
| | | |
|---|---|---|
| *B60P 7/08* | (2006.01) | |
| *B60Q 9/00* | (2006.01) | |
| *F21S 9/03* | (2006.01) | |
| *G08B 5/36* | (2006.01) | |
| *F21Y 113/10* | (2016.01) | |

(52) U.S. Cl.
CPC .............. *B60P 7/0861* (2013.01); *B60Q 9/00* (2013.01); *F21S 9/037* (2013.01); *G08B 5/36* (2013.01); *F21Y 2113/10* (2016.08)

(58) Field of Classification Search
CPC .......... B60P 7/0861; B60Q 9/00; F21S 9/037; G08B 5/36
USPC ...................................................... 340/425.5
See application file for complete search history.

(56) References Cited

U.S. PATENT DOCUMENTS

| | | | | |
|---|---|---|---|---|
| 7,112,023 B1* | 9/2006 | Tardif | ................... | B60P 7/0861 340/440 |
| 8,506,220 B2* | 8/2013 | Morland | ............... | B60P 7/0861 340/440 |
| 2004/0011277 A1* | 1/2004 | Barnes | .................. | B60R 22/105 116/202 |
| 2008/0277914 A1* | 11/2008 | Carine | ................... | B60R 22/48 280/801.1 |
| 2011/0119877 A1* | 5/2011 | Jackson | ............... | B60P 7/0823 362/249.02 |
| 2012/0260740 A1* | 10/2012 | Huguenot | ............. | B60P 7/0861 73/826 |
| 2013/0162420 A1* | 6/2013 | Stoddard | ............... | B60P 7/0861 340/425.5 |
| 2019/0001863 A1* | 1/2019 | Taylor | ..................... | H04W 4/70 |

\* cited by examiner

*Primary Examiner* — Quan Zhen Wang
*Assistant Examiner* — Mancil Littlejohn, Jr.
(74) *Attorney, Agent, or Firm* — Underwood and Associates, L.L.C.

(57) ABSTRACT

A device for visually verifying tautness of a cargo strap includes a hinged body, itself including first and second platform surfaces configured to be shifted between an open configuration and a closed configuration. In the closed configuration, the first and second surfaces form a confronting relationship. The device further includes a light source disposed on the first platform and is configured to emit light parallel to the first platform surface.

12 Claims, 6 Drawing Sheets

SYSTEMS AND METHODS FOR VISUALLY DETERMINING SECURITY OF TIE-DOWN CARGO STRAPS

TECHNICAL FIELD

This disclosure relates to systems and methods for visually determining the security of a tie-down strap, such as a cargo ratchet strap. Without limitation, the systems and methods can be applicable in the field of transportation and trailering.

BACKGROUND

Straps are frequently used for securing a load to a truck or trailer. Instances where straps are commonly used for this purpose include trailering boats, all-terrain vehicles (ATVs), cars, motorcycles and other objects. In the trucking industry, straps are used to secure loads to various types of trucks and trailers, e.g., flatbed trailers.

Pulling a trailer of any kind, whether it be a small trailer pulled by a car, or a large trailer pulled by a tractor truck can introduce danger to the driver and other persons on the road. In particular, if the load of the truck or trailer is not secured, it may fall off, potentially causing loss of property and injury to other drivers in the vicinity.

Many types of tie-down straps exist for the purpose of securing a load to a trailer. One type frequently used is referred to as a "ratchet strap," or "cargo strap" which is generally a two-piece strap wherein one strap is connected to a ratchet mechanism. The ratchet strap is useful because it allows the user to adjust the tightness of the strap around or over a load to his or her desire.

Straps may become loose when driving, however, regardless of how tight the strap was initially installed around a load. Bumps in the road, wind, shifting loads, material stretching, and other factors can cause a strap to become loose to the point where a load escapes the strap, or the strap detaches from the trailer. For this reason, strap manufacturers often include disclaimers on product packaging that recommend checking the security of the strap every 20-50 miles. However, especially for commercial truckers, stopping so often is impractical, potentially dangerous and can significantly extend transit time. It goes without saying that checking the security of tie-down straps while moving is an inherently dangerous operation.

Accordingly, there is a need for a driver to be able to visually determine the security of his tie down straps while driving, in particular, while driving at night or in low-visibility conditions, which can reduce dangerous operations and unnecessary stops along a route.

SUMMARY

In general, a visual indicator of the security of a tie-down strap is disclosed. The visual indicator can be attached to a tie-down strap at a desired location, e.g., within a driver's field-of-view in a rear-view mirror. The visual indicator can include a light source or be light-reflective. As the driver drives, he can quickly and easily ascertain the security of the straps by referencing his rear-view mirror and confirming that the indicator is present and stable. If the indicator appears to be moving or has shifted, the driver can determine that the strap has loosened and may be unsafe.

In a first aspect, a device for visually verifying tautness of a cargo strap is disclosed. The device includes a hinged body, itself including first and second platform surfaces that are configured to be shifted between an open configuration and a closed configuration. In the closed configuration, the first and the surfaces form a confronting relationship. The device further includes a light source disposed on the first platform that is configured to emit light parallel to the first platform surface.

In one embodiment, the device further includes a securement member configured to reversibly secure the first and the second platform in the confronting relationship. For example, the securement member can be a nut and bolt combination hingedly coupled to a terminal end portion of the second platform member. The device can further include a slot on a terminal end portion of the first platform that is configured to transversely receive the bolt of the nut and bolt assembly.

In one embodiment, the first and the second platform surfaces are configured to be clamped around a cargo strap when in the closed configuration. A gap between about 0.25 mm and about 2 mm can be provided between the first and the second platform surfaces when the hinged body is in the closed configuration.

In one embodiment, the device further includes a housing disposed on the first platform for enclosing the light source. The housing can include a front face perpendicular to the first platform and can be formed of a clear, resilient plastic or glass, and configured to allow light from the light source to pass therethrough.

In one embodiment, the light source can emit a selected color of light from one or more light output color options.

In one embodiment, at least one of the first or the second platform surfaces includes a texture for gripping the cargo strap when the device is in the closed configuration.

In one embodiment, the device further includes a rechargeable battery configured to provide electrical power to the light source. A photovoltaic cell in electronic communication with the rechargeable battery can be used to recharge the battery.

In another aspect, a device for attachment to a cargo strap includes a main body including a top surface and a bottom surface, a housing disposed on the top surface, the housing including one or more light sources, and a rotatable platform member hingedly coupled to the main body by a hinge on a first end of the rotatable platform member.

In one embodiment, the housing includes a window for allowing light from the one or more light sources to pass therethrough. The window can be disposed on a face of the housing that is perpendicular to the top surface of the main body.

In one embodiment, the rotatable platform is configured to be reversibly brought into a confronting relationship with the bottom surface of the main body. The device can further include a securement member configured to reversibly lock the rotatable platform in the confronting relationship with the bottom surface of the main body.

In one embodiment, the one or more light sources are configured to emit a selected color of light from one or more light output color options.

In one embodiment, the device further includes a user control for activating the one or more light sources and selecting a light color from the one or more light output color options.

In one embodiment, the device further includes a power source configured to provide electrical power to the one or more light sources. The power source can be a rechargeable battery, and the device can further include a photovoltaic in circuit communication with the battery to provide charging.

Certain advantages of the systems and methods include the ability to visually verify the security of tie-down straps, in particular, those used for trailering, without stopping the towing vehicle; the ability to visually monitor the security of one or more tie-down straps during travel; the ability to monitor a strap becoming loose and plan a safe egress from a road or highway; the ability to visually verify the security of tie-down straps at night and in low-visibility conditions; among others.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

Figure 1:
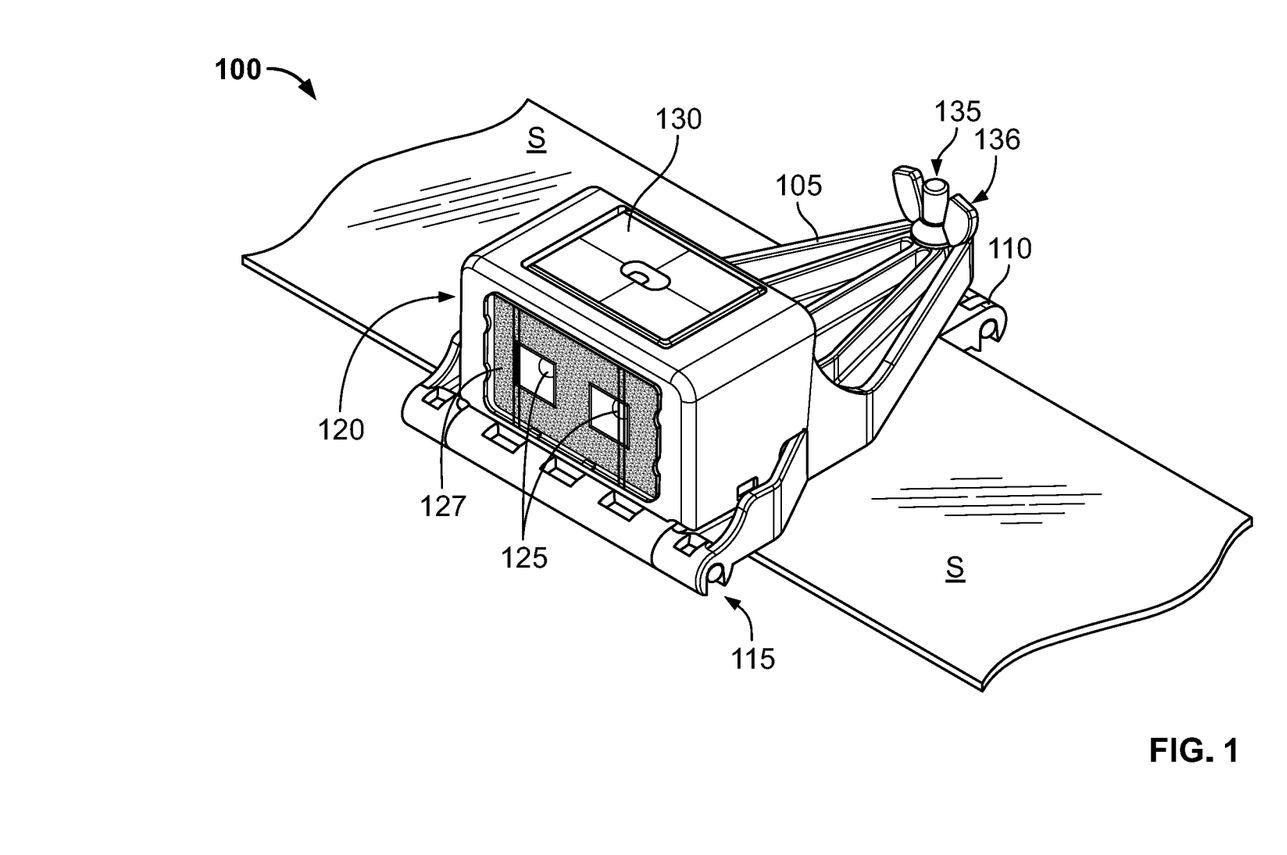
FIG. 1 is a perspective view of a visual indicator 100 attached to a strap S according to one embodiment.

FIG. 1 shows a visual indicator 100 attached to a strap S, according to one embodiment. In this disclosure, the strap S does not constitute a portion of the visual indicator 100; instead it is shown to illustrate a non-limiting use of the visual indicator 100.

Figure 2:
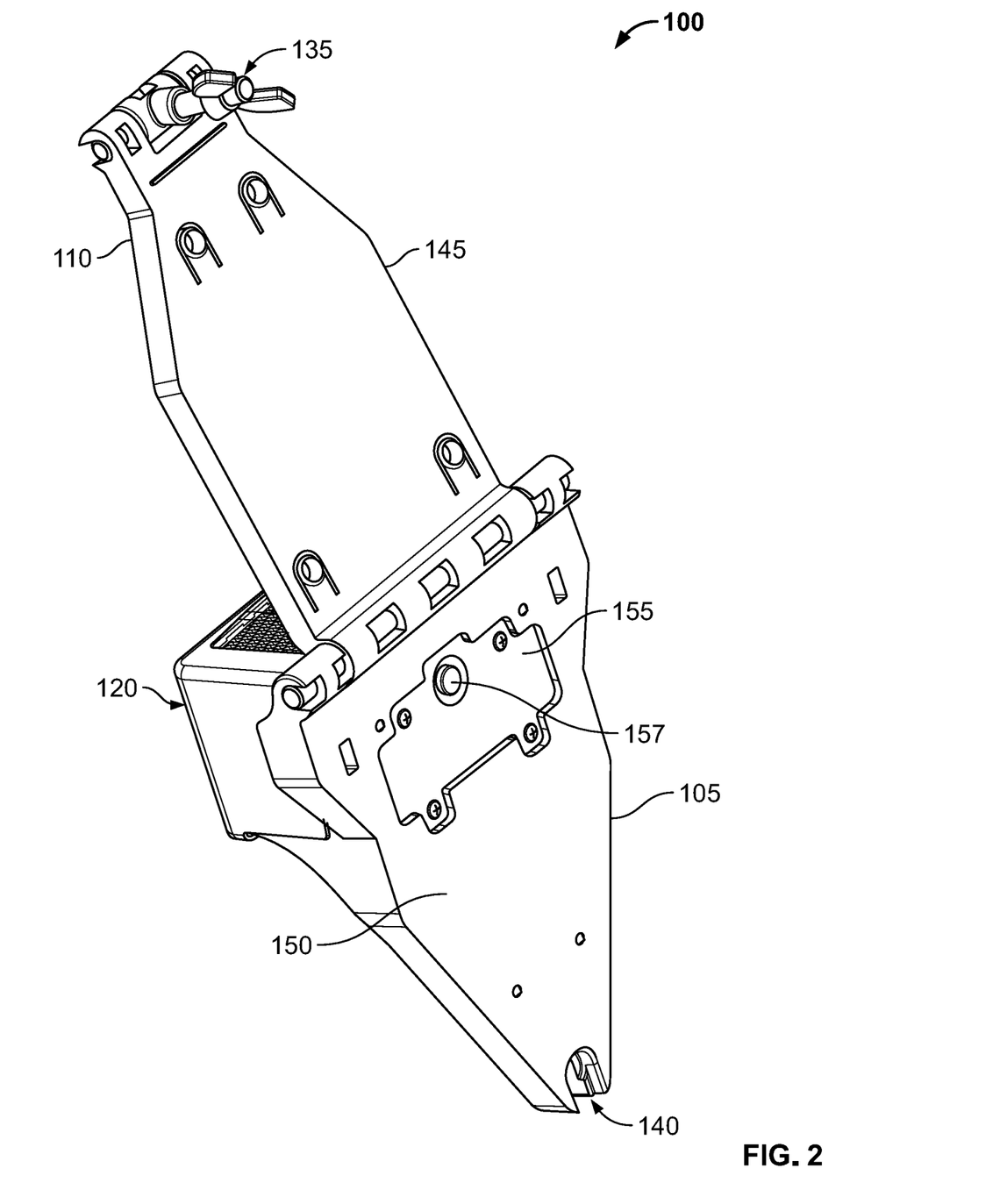
FIG. 2 shows the visual indicator of FIG. 1 in an open configuration according to one embodiment.

In this embodiment, the visual indicator 100 includes a top platform portion 105 and a bottom platform portion 110 (hereinafter 'top portion 105' and 'bottom portion 110'), hingedly coupled by hinge 115, so that the top (105) and bottom (110) portions can be shifted between a closed configuration (FIG. 1) and an open configuration (FIG. 2). The top (105) and bottom (110) portions can be brought into a confronting relationship with strap S as shown, e.g., in FIG. 1, by a clamping force. In this embodiment, the top (105) and bottom (110) portions can be held together, and a desired clamping force can be applied to the strap S through, e.g., the use of a bolt 135 and wing nut 136 combination. In this embodiment, the top portion 105 includes a notch 140 (FIG. 2) appropriately sized to allow the bolt 135 to enter transversely therethrough; the wingnut 136 can then be used to secure the top (105) and bottom (110) portions together and apply a clamping force to the strap S as shown in the configuration of FIG. 1. A gap between about 0.25 mm (e.g., 0.1 mm, 0.25 mm, 0.3 mm, 0.4 mm) and about 2 mm (e.g., 1.5 mm, 2 mm, 2.5 mm) can be provided between the first and the second platform surfaces when the hinged body is in the closed configuration.

In this embodiment, the top portion 105 includes a container body 120 for housing one or more light sources on a front face 127 and a power supply for the light sources. In this embodiment, the container body 120 includes two light-emitting diodes (LEDs) 125. It should be understood that any number of LEDs or other light sources can be used. In this embodiment, the front face 127 includes a clear plastic shield designed to provide specular refraction of the light emanating from the LEDs 125, so that from a viewer's perspective, the entire front face 127 appears to be illuminated when the LEDs 125 are activated.

In this embodiment, the LEDs 125 can be configured to emit a chosen light color, e.g., red, blue, yellow, orange, etc. In one embodiment, the visual indicator 100 can be configured to emit a single light color from the LEDs 125; however, in other embodiments, the visual indicator 100 can be configured to select an LED output color from a selection of available colors. In such an embodiment, the visual indicator 100 can include electronic circuitry (not shown in the figures for the sake of drawing clarity) that allows a user to toggle through available light color choices. For example, the visual indicator 100 can include a power control button 157 that allows a user to power the visual indicator 100 on and off, and also to cycle through available color output options by pushing the power control button 157 once the unit power is on.

In this embodiment, the visual indicator 100 includes a solar array panel 130 configured to provide electric current to a rechargeable battery (not shown in FIG. 1 or 2) housed within container body 120. Other power sources can alternatively be used, e.g., plug-in, constant-power cables, disposable batteries or other power sources.

In this embodiment, the visual indicator 100 includes a light sensor (not shown in FIG. 1 or 2 for the sake of drawing clarity). The light sensor is in electronic communication with a control circuit and is configured to measure the ambient light intensity; when the ambient light intensity falls below a selected threshold level, the visual indicator 100 automatically turns on, i.e., the LEDs 125 are activated. This way, the visual indicator can automatically activate for night time use and in low visibility environments.

Referring now to FIG. 2, in this embodiment, the underside 150 of the top portion 105 includes an access door 155 allowing access to the rechargeable battery and electronic components within the container body 120.

In this embodiment, the underside 150 of the top portion 105, and the underside 145 of the bottom portion 110 are smooth; however, in alternative embodiments, these surfaces can be roughed, can include ridges or other surface texturing to provide increased grip as the undersides 145, 150 confront strap S when the visual indicator 100 is in a closed configuration (FIG. 1).

Figure 3:
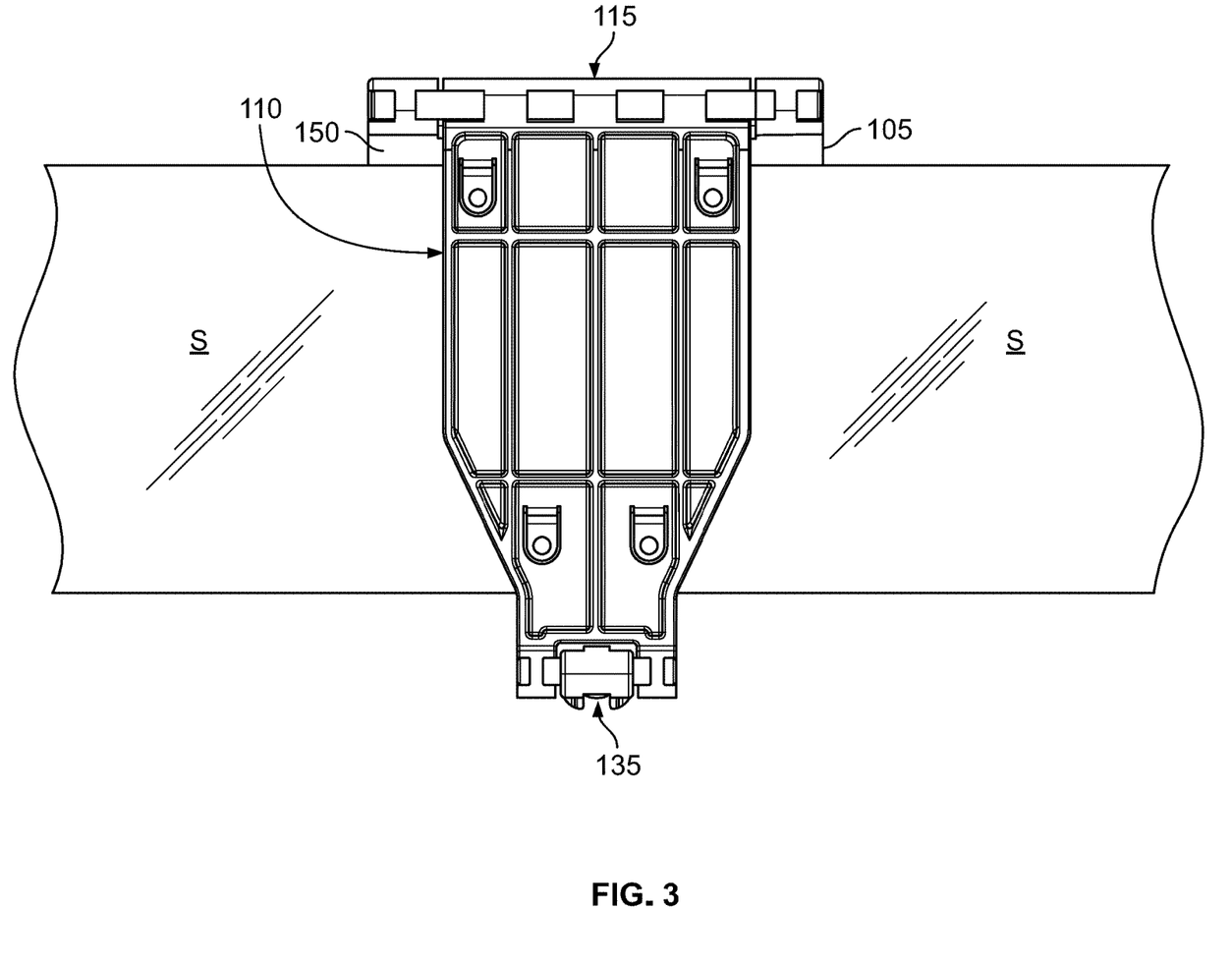
FIG. 3 illustrates a bottom-side portion of the visual indicator of FIG. 1 attached to the strap S according to one embodiment.

Referring now to FIG. 3, the underside of the visual indicator 100 is shown in a closed configuration about strap S in the same configuration as that shown in FIG. 1. It should be understood that the size of the top 105 and bottom portions can be selected according to the width of the strap S that the visual indicator 100 is intended for. For example, the distance between hinge 115 and bolt 135 can be slightly greater than the width of the strap S. In one non-limiting example, the distance between hinge 115 and bolt 135 can be 5 inches to accommodate a 4-inch strap.

Figure 4:
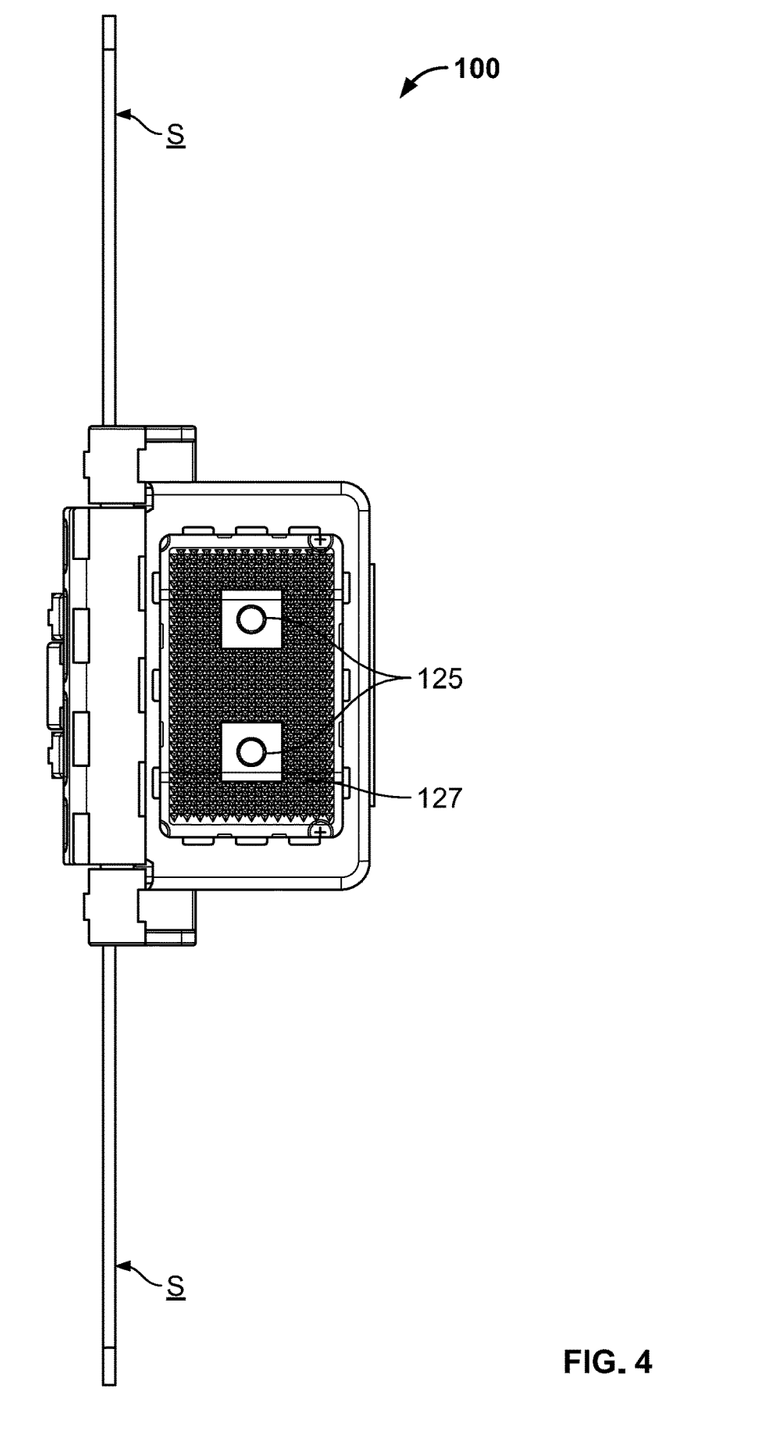
FIG. 4 illustrates a front face of the visual indicator of FIG. 1 attached to the strap S according to one embodiment.

Referring now to FIG. 4, the visual indicator 100 is shown in an operative configuration, attached to strap S. The configuration shown in FIG. 4 illustrates one intended use of the visual indicator 100 for monitoring the security of strap S, which, in this illustration, should be understood to be securing a load to a trailer. For example, often times when straps are used to secure a load to a trailer, a portion of the strap, particularly on the sides, is vertically-oriented. In a preferred embodiment, the visual indicator 100 can be placed at a desired location on the vertically-oriented strap S, so that a driver can see the visual indicator 100 in his rear-view mirror.

FIG. 4 illustrates that when the visual indicator 100 is secured to the vertically-oriented strap S, front face 127 is orthogonally oriented, facing forward. Accordingly, light sources 125 are also projecting forward. This configuration allows a driver to simply reference his rear-view mirror and verify that the visual indicator 100 is present to confirm the security of the strap to the trailer or other object.

One advantage of the visual indicator is that it can provide a qualitative measure of strap tension. For example, when a strap is tightened properly, the visual indicator should remain relatively still as a vehicle travels. However, as a strap loosens from load shifting, stretching or other factors, the wind should create a buffeting effect that causes the visual indicator 100 to quickly shift back-and-forth. This effect can manifest as a "blinking" indication in the rear-view mirror of a driver, quickly providing an indication that he needs to stop—or prepare to stop—in the near future to tighten the strap. Of course, it should be understood that if the driver notices the light of the visual indicator either missing or flailing about, the strap may have come completely detached from the trailer. In such an instance, the light may be used, especially at nighttime, to find the strap if it has fallen off completely.

In this and other embodiments, the LEDs 125 or the front face 127, or both can be configured to provide different colors of light. For example, the LEDs can be configured to produce colored light; or the front face 127 can incorporate tinted or colored plastic. Accordingly, in one approach, a driver may use a different visual indicator 100, each providing a different light color, on each strap that secures a load to a trailer. This allows the driver to recognize which straps are secure and which may be coming loose during a trip. Similarly, a driver may attach visual indicators 100 on separate straps and place them at different heights so that each one is clearly visible by use of the rear-view mirror.

Figure 5:
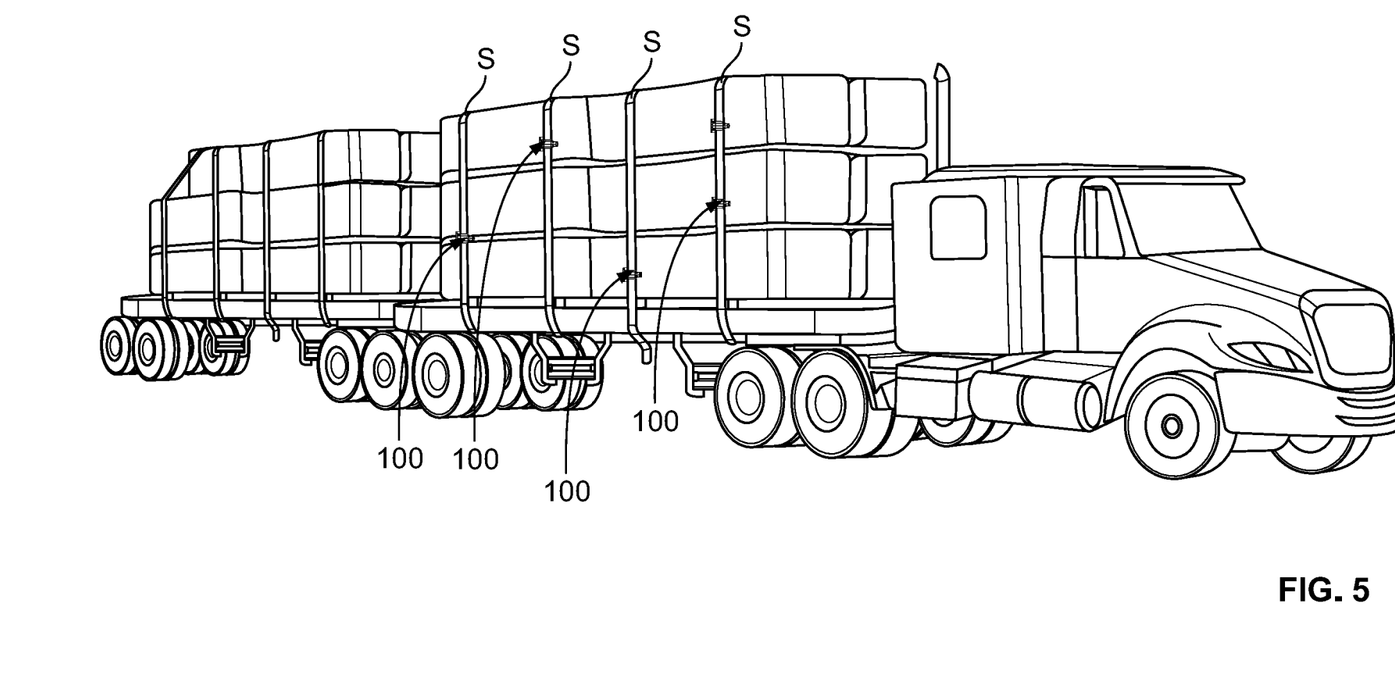
FIG. 5 illustrates the use of the visual indicator of FIG. 1 attached to cargo straps securing a load on a tractor/trailer.
Figure 6:
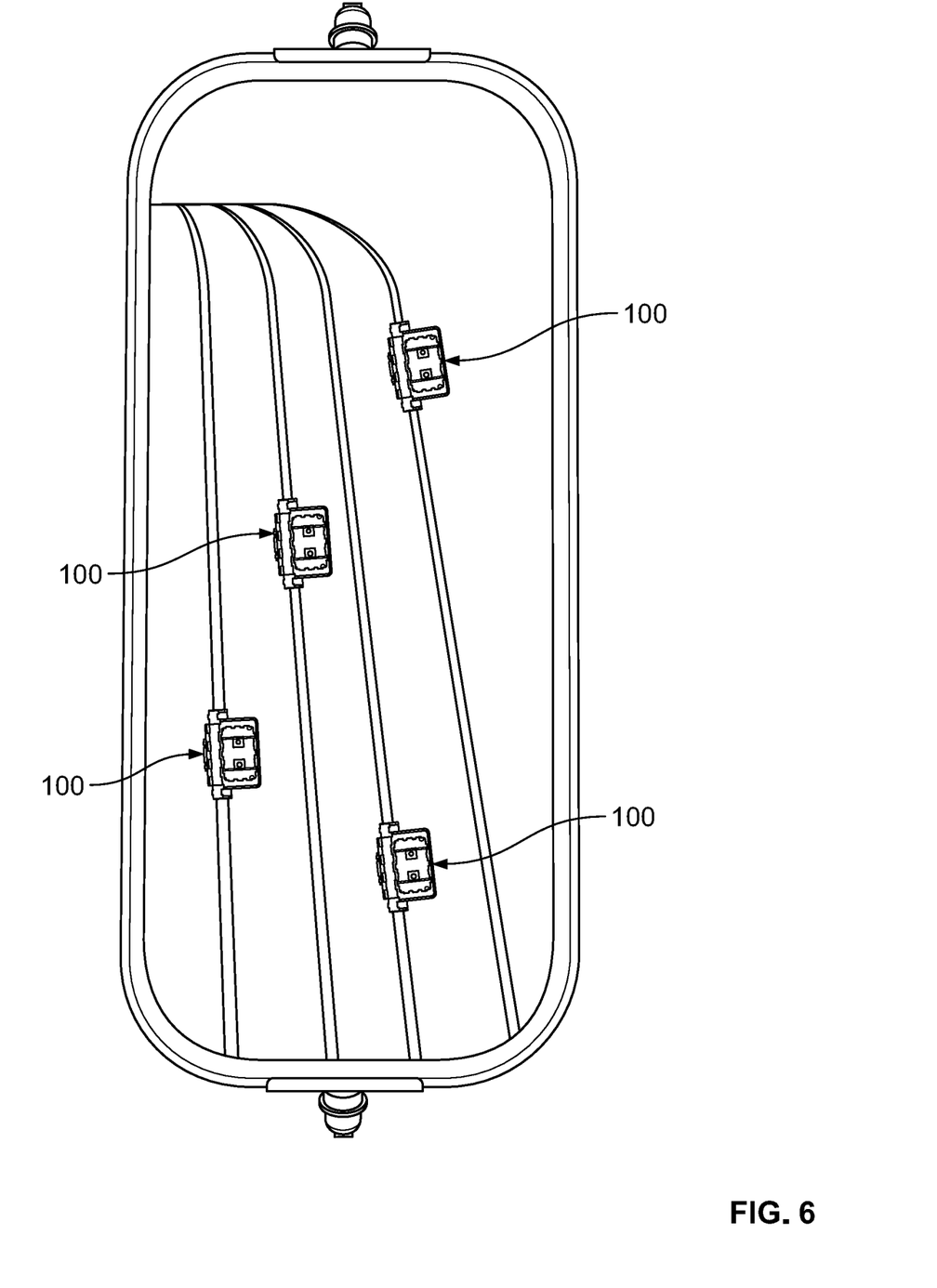
FIG. 6 illustrates a view of a tractor/trailer rear-view mirror showing the visual indicator of FIG. 1 attached to cargo straps.

Referring now to FIGS. 5 and 6, visual indicators 100 are illustrated in an operative environment and in an operative configuration. In this example, a flat-bed trailer has a load of bales that are secured by multiple straps S. In this example, the front straps each have a visual indicator 100 attached thereto, such that front face 127 is pointing forward, toward the tractor. FIG. 6 illustrates an exemplary view of the truck driver's rear-view mirror, showing each of the visual indicators 100 on the flatbed trailer. By referencing his rear-view mirror, he can tell if the visual indicators are loose or missing, indicating that a strap may fall off, or has already fallen off, respectively.

A number of illustrative embodiments have been described. Nevertheless, it will be understood that various modifications may be made without departing from the spirit and scope of the various embodiments presented herein. Accordingly, other embodiments are within the scope of the following claims.

What is claimed is:

1. A device for visually verifying tautness of a cargo strap, comprising:
   first and second platform surfaces hingedly joined and configured to be shifted between an open configuration and a closed configuration, wherein in said closed configuration, said first and said surfaces form a confronting relationship;
   a housing enclosure, integral with or connected to said first platform, said housing enclosure comprising a top side parallel with said first platform and a front face adjacent said top side that is perpendicular to said first platform;
   at least one light source disposed within said housing enclosure and oriented to project light from said front face;
   wherein said front face comprises a glass or plastic shield designed to provide specular refraction of said light from said one or more light sources such that the entirety of said glass or plastic shield appears illuminated when said one or more light sources is activated.

2. The device of claim 1, further comprising a securement member configured to reversibly secure said first and said second platform in said confronting relationship.

3. The device of claim 2, wherein said securement member is a nut and bolt combination hingedly coupled to a terminal end portion of said second platform member.

4. The device of claim 3, further comprising a slot on a terminal end portion of said first platform configured to transversely receive said bolt of said nut and bolt assembly.

5. The device of claim 1, wherein said first and said second platform surfaces are configured to be clamped around a cargo strap when in said closed configuration.

6. The device of claim 5, wherein a gap between about 0.25 mm and about 2 mm is provided between said first and said second platform surfaces when said hinged body is in said closed configuration.

7. The device of claim 1, wherein said housing enclosure fully encloses said light source.

8. The device of claim 1, wherein said light source is capable of emitting a selected color of light from one or more light output color options.

9. The device of claim 1, wherein at least one of said first or said second platform surfaces comprises a texture for gripping said cargo strap when said device is in said closed configuration.

10. The device of claim 1, further comprising a rechargeable battery configured to provide electrical power to said light source.

11. The device of claim 10, further comprising a photovoltaic cell in electronic communication with said rechargeable battery.

12. A method for visually verifying tautness of a cargo strap, comprising:
   providing the device according to claim 1;
   securing said device to a cargo strap of a vehicle, such that said front face of said device is facing in the direction of forward travel of said vehicle;
   activating said one or more light sources of said device; and
   monitoring said device from a driver's position of said vehicle for a flashing effect from said device, said flashing effect being indicative of buffeting of said cargo strap, and said buffeting being indicative of said cargo strap being loose.

\* \* \* \* \*